May 17, 1938.  F. G. BOVARD  2,117,695
TRIMMER
Filed May 20, 1936  3 Sheets-Sheet 1
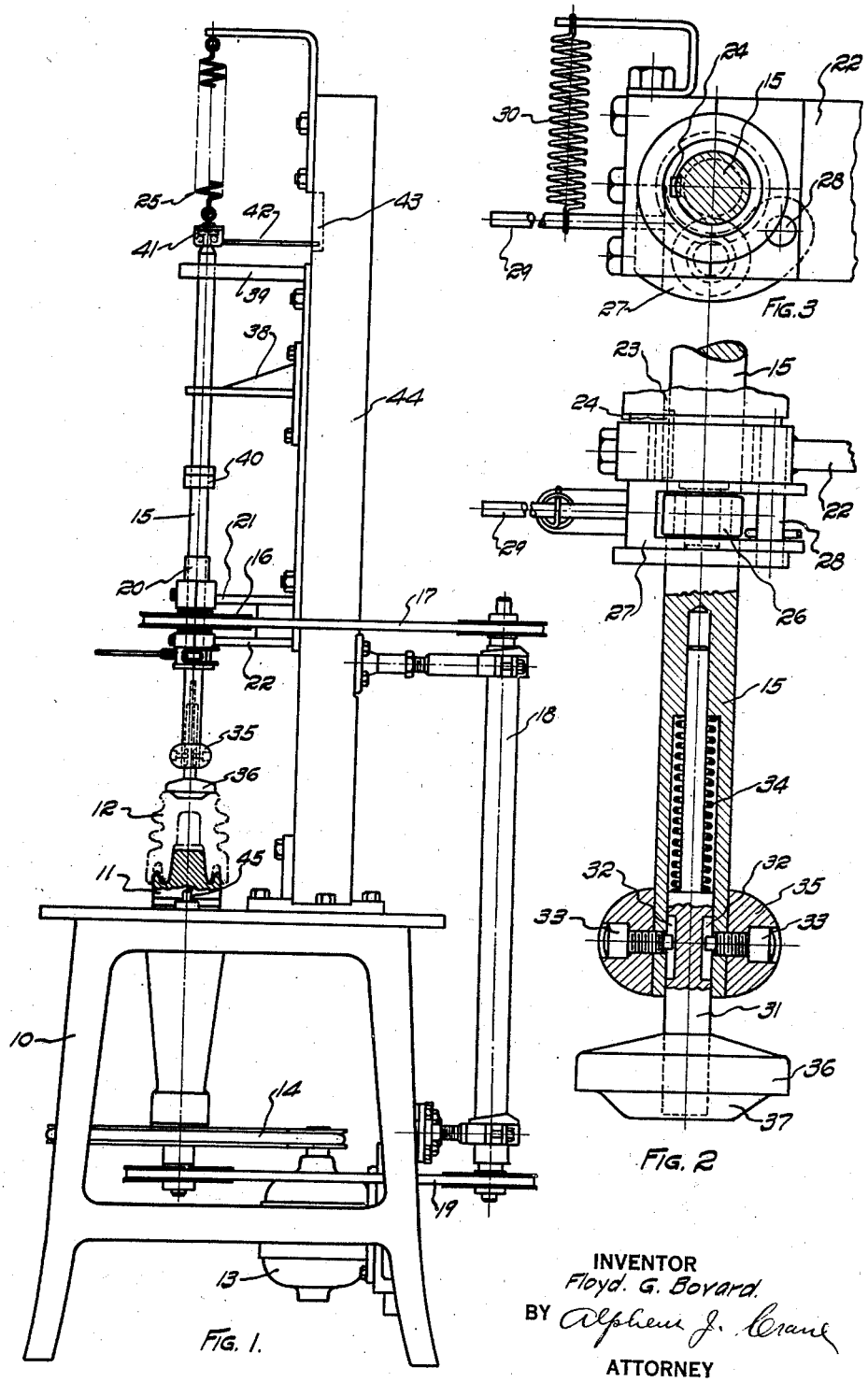
INVENTOR
Floyd G. Bovard
BY
ATTORNEY May 17, 1938. F. G. BOVARD 2,117,695
TRIMMER
Filed May 20, 1936 3 Sheets-Sheet 2

INVENTOR
Floyd G. Bovard
BY
ATTORNEY

May 17, 1938.　　　F. G. BOVARD　　　2,117,695
TRIMMER
Filed May 20, 1936　　　3 Sheets-Sheet 3

INVENTOR
Floyd G. Bovard
BY Alpheus J. Crane
ATTORNEY

Patented May 17, 1938

2,117,695

UNITED STATES PATENT OFFICE 2,117,695

TRIMMER

Floyd G. Bovard, Akron, Ohio, assignor to The Ohio Brass Company, Mansfield, Ohio, a corporation of New Jersey Application May 20, 1936, Serial No. 80,767

7 Claims. (Cl. 142—42)

This invention relates to trimmers for shaping the outer surfaces of devices, particularly those of plastic material, and has for one of its objects the provision of a trimmer which will not distort the work piece.

A further object of the invention is to provide improved means for driving the work piece and an improved guide for the trimming tool which will cooperate to effect trimming of the work piece without distortion.

A further object of the invention is to provide a trimmer which shall be of improved construction and operation.

Other objects and advantages will appear from the following description.

The invention is exemplified by the combination and arrangement of parts shown in the accompanying drawings and described in the following specification, and it is more particularly pointed out in the appended claims.

In the drawings:

Fig. 1 is an elevation with parts in section showing the supporting frame and driving mechanism of a trimmer made according to the present invention.

Fig. 2 is a fragmentary elevation partly in section of a portion of the driving mechanism shown in Fig. 1, but on a larger scale than Fig. 1.

Fig. 3 is a top plan view of the mechanism shown in Fig. 2.

Figure 5:
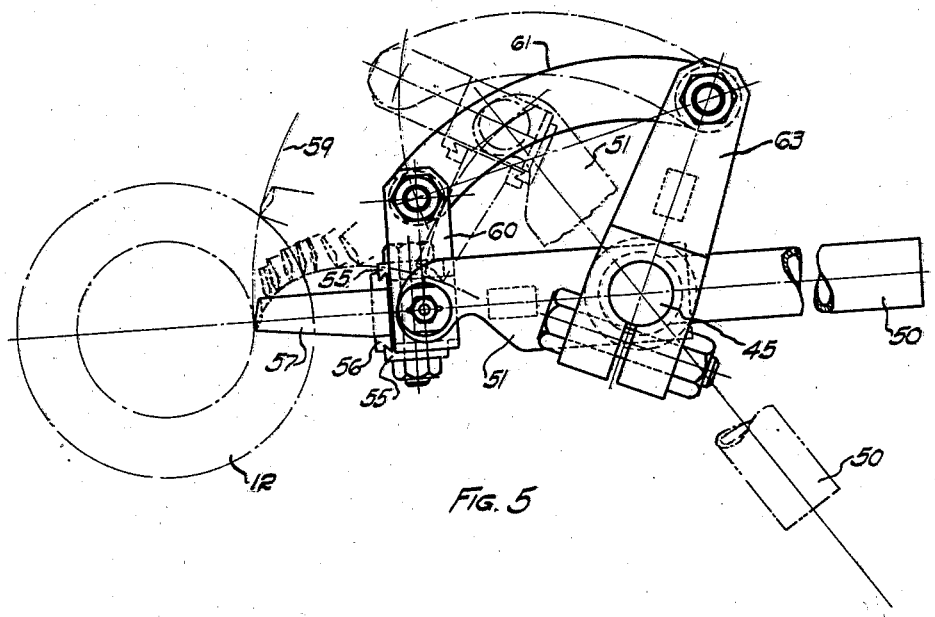
Fig. 5 is a plan of the mechanism shown in Fig. 4.

In the formation of devices, such as electrical insulators, from plastic material, it has been customary to rotate the work piece while the device is being shaped. The outer surface of the article can be formed either by pressing the plastic material in shape or by trimming excess material from the work piece. Where a trimming process is used, the article is first partially formed in a press or by other suitable means and then placed upon the rotating support and a trimming tool of suitable contour is moved against the surface of the article so as to remove the excess material and impart the desired shape to the outer surface of the piece. Heretofore, it has been the custom simply to rest the article upon a rotating support during the trimming process, the article being driven by the rotation of the support. It has been found in practice, however, that in trimming plastic clay devices that have considerable height, such as insulators with a number of ribs or petticoats, the pressure of the tool in removing the excess material is apt to distort the work piece, due to the fact that the torque exerted by the tool must be transmitted through the plastic material to the rotating support. In the present invention, applicant overcomes this difficulty by regulating the angle of the cutting portion of the tool relative to the surface of the work piece so as to remove the excess material with a minimum of pressure for all positions of the tool and also by providing a supplemental drive for the upper end of the work piece so that both ends of the piece are driven at the same angular velocity so that the torque on the work piece is reduced to a minimum.

In Fig. 1 of the drawings, the numeral 10 designates a supporting frame having a rotating spindle 11 upon which the work piece 12 is carried. The spindle 11 is driven by a motor 13 through a belt 14. Above the work piece 12 and in axial alignment with the spindle 11 there is a second rotating spindle 15 driven by a pulley 16 and belt 17 from a countershaft 18. The countershaft 18 is connected by a belt 19 to the spindle 11 so that the spindles 11 and 15 are driven at the same angular velocity. The pulley 16 has a sleeve 20 formed integral therewith and projecting from each side of the pulley and journalled in bearings 21 and 22. The sleeve 20 has a keyway 23 formed therein and the spindle 15 has a key 24 which slides in the key-way 23 so that the spindle is free to move vertically through the sleeve 20 but is driven by the sleeve at its various positions of vertical adjustment. The spindle 15 is normally drawn up by a spring 25 but may be locked in its lowermost position by a roller 26 which engages a circumferential groove in the spindle 15 and which is journalled in a carrier 27 pivotally mounted on a pin 28 so that the roller may be moved into and out of engagement with the groove in the spindle 15. The carrier 27 operates in a slot formed in the enlarged outer end of the bearing member 22. The carrier 27 is provided with a handle 29 by means of which it may be rotated upon its pivot 28 and a spring 30 normally holds the carrier in a position in which the roller 26 engages the groove in the spindle 15.

Slidably mounted in the lower end of the spindle 15 is a shank 31 provided with a pair of slots 32 which are engaged by the ends of cap screws 33 for limiting the longitudinal movement of the shank 13 and for constraining the shank to rotate with the spindle 15. The shank is normally pressed to its lowermost position by a spring 34. The cap screws 33 also secure a knob 35 to the spindle 15 by means of which the spindle may be raised or lowered by the operator. A driving head 36 is secured to the lower end of the spindle having its lower face 37 shaped to fit the upper end of the work piece 12. The upper end of the spindle 15 may be provided with suitable brackets 38 and 39 in which the spindle is free to slide and rotate. A stop 40 may be provided for limiting the vertical movement of the spindle. The spring 25 is connected to the upper end of the spindle by a block 41 in which the upper end of the spindle is suspended by suitable roller bearings permitting rotation of the spindle in the block. This arrangement is to prevent the spring 25 from being twisted by the rotation of the spindle. The block 41 may be held from rotation by a finger 42 which extends into a slot 43 in the standard 44 mounted on the base 10. The tool for trimming the work piece 12 is mounted on a post 45 fixed to the upper face of the top of the frame 10 and spaced away from the spindle 11 at one side thereof. When it is desired to place a work piece on the machine, the stop roller 26 will be released from engagement with the groove in the spindle 15 and the spring 25 raises the driving head 36 to the upper limit of its range of movement. The work piece 12 is then placed upon the spindle 11 and the operator draws the spindle down by grasping the knob 36 and presses the driver head 37 into contact with the upper end of the work piece. This will compress the spring 34 so that the driving head 37 is resiliently held in engagement with the upper end of the work piece. When the motor is then started, the work piece will be driven from both the top and the bottom ends so that any circumferential force on the surface of the work piece will be transmitted a minimum distance by the piece itself and will be divided between the two live spindles at opposite ends of the work piece. This double drive is particularly advantageous where the trimmer knife extends a considerable distance along the work piece so as to trim most of the surface at one time.

Figure 4:
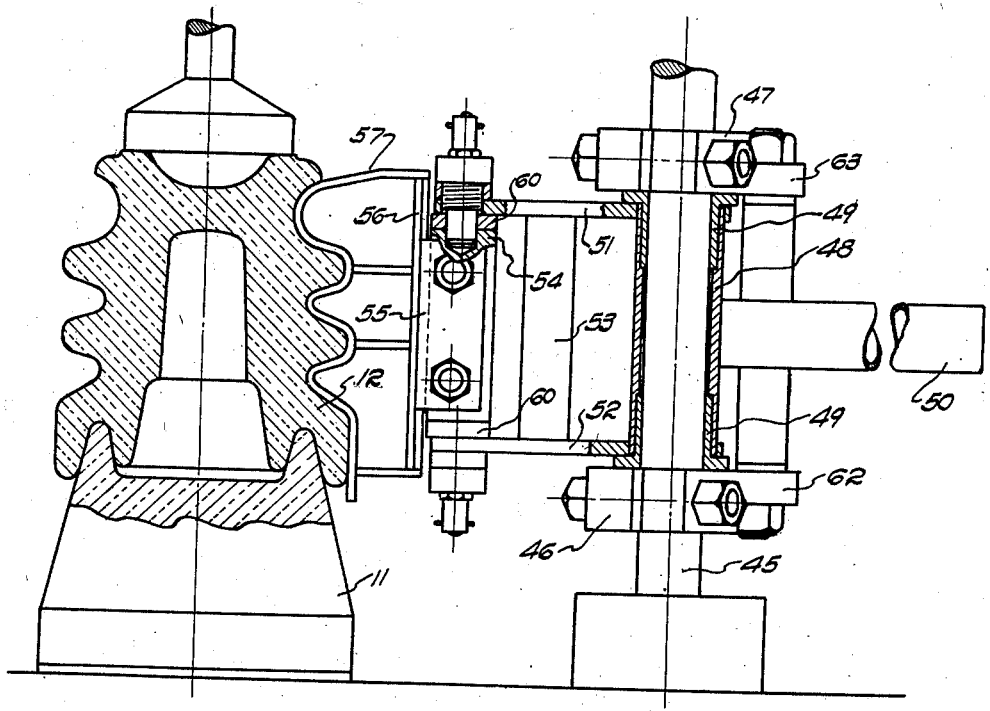
Fig. 4 is an elevation with parts in section showing a tool guide made according to the present invention.

In the form of tool carrier shown in Figs. 4 and 5, a pair of brackets 46 and 47 are clamped to the post 45 and between these brackets a sleeve 48 is journalled on the post, the ends of the sleeve being provided with bushing bearings 49. A handle 50 is fixed to the sleeve 48 for rotating the sleeve on its bearing and a pair of fingers 51 and 52 are fixed to the opposite ends of the sleeve 48 respectively and are provided with a brace 53 to form a rigid construction and constrain the two fingers to rotate together and in unison with the sleeve 48 whenever the handle 50 is swung about the post 45.

Figure 6:
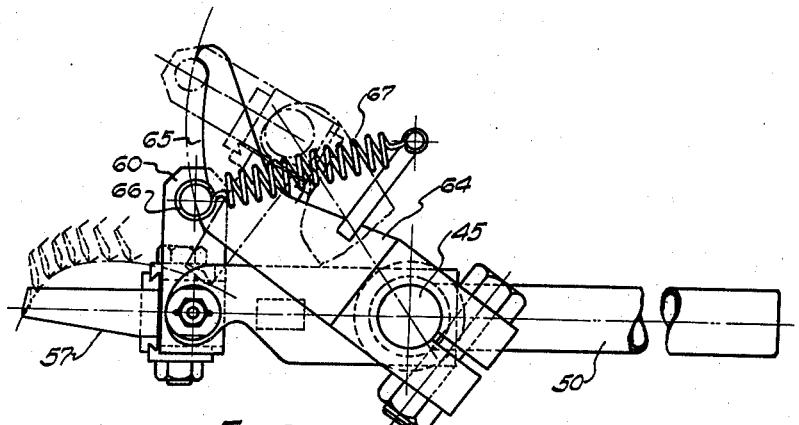
Fig. 6 is a top plan view of another form of tool guide.

Pivoted between the outer ends of the fingers 51 and 52 is a block 54 having clamping jaws 55 for holding a bar 56 to which the trimming knife 57 is attached. The knife 57 as shown in Fig. 4 is curved to impart the desired outline to the work piece 12. Since the fingers 51 and 52 swing about the post 45, the trimming knife would follow the arc 59 if the tool 57 were rigidly fixed to the ends of the fingers 51 and 52. This is the arrangement which has heretofore been used and it is seen from Fig. 5 that with this arrangement, although the cutting edge is substantially tangent to the periphery of the work piece in the final position of the knife, it approaches a position almost normal to the periphery of the work piece at its outermost position at the beginning of the cut. In this position, shown in broken lines in Fig. 5, it is seen that the knife performs a scraping action at the beginning of the cut rather than a cutting action. This produces a heavy drag on the periphery of the piece and results in an uneven cut and distortion of the piece. To overcome this difficulty, applicant has provided link mechanism to control the angle of the cutting edge as the knife moves inwardly from its outermost position at the beginning of the cut to its inner position at the end of the cut. This mechanism comprises a pair of ears 60 fixed to the block 54 and extending approximately at right angles to the plane of the cutting blade 57. A pair of links 61 are pivoted at the outer ends of the ears 60 and also to a pair of arms 62 and 63 fixed to the brackets 46 and 47 respectively. Due to this link mechanism, whenever the handle 50 is rotated in a clockwise direction, as viewed in Fig. 5, the ears 60 and cutter blade 57 will be rotated in a counter-clockwise direction about their pivotal support in the ends of the fingers 51 and 52. The extreme position of the handle 50 and the fingers 51 and link mechanism is shown in broken lines in Fig. 5 and several intermediate positions of the cutting edge are also shown in broken lines in this figure. The length of the various lever arms and links can be varied to impart almost any desired movement of the cutter blade. With the arrangement and proportions shown in the drawings, the cut edge is maintained approximately tangent to the surface for all positions of the blade. It has been found advantageous in practice to increase the clearance angle slightly as the blade moves inwardly and the arrangement of the lever arms in Figs. 5 and 6 is such that this slight variation from the tangent position is secured and the blade maintained at the most advantageous cutting angle throughout its entire range of travel. This secures a very smooth cut for removing the excess material and also reduces the torque on the plastic work piece to a minimum.

In the form of the tool holder shown in Fig. 6, the arms 62 and 63 and the links 61 are replaced by an arm 64 which carries a cam 65 for guiding a roller 66 on one of the ears 60. A spring 67 maintains the roller in engagement with the cam. It will be apparent that the cam 65 may be made of a suitable shape to impart any angular movement desired to the cutter blade 57.

Figure 7:
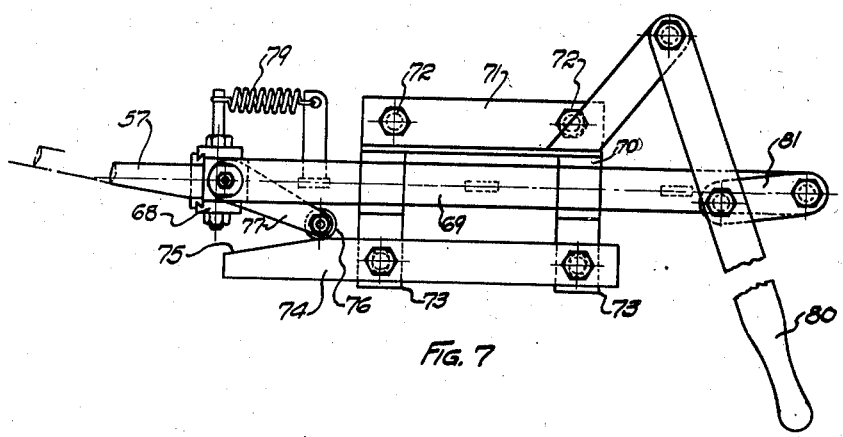
Fig. 7 is a top plan of still another form of tool guide.
Figures 8, 9:
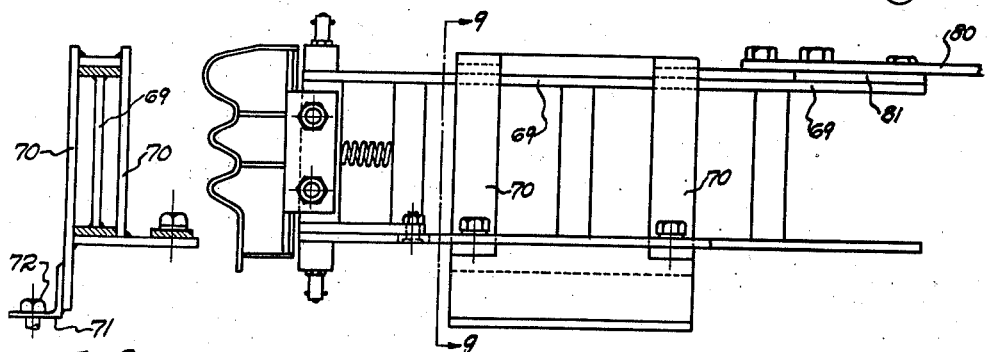
Fig. 8 is an elevation of the tool guide shown in Fig. 7.
Fig. 9 is a section on line 9—9 of Fig. 8.

In the arrangement shown in Figs. 7, 8 and 9, the tool holder moves toward the work in a radial direction instead of swinging about a fixed pivot, as in the forms previously described. In this arrangement the trimming tool 57 is carried by a tool head 68 mounted on the end of the slide 69. The slide 69 moves between uprights 70 forming a supporting frame which is secured to the machine base by a bracket 71 and cap screw 72. Ears 73 project from the frame 70 and carry a cam bar 74 having a guide surface 75 arranged to engage a roller 76 carried by an arm 77 fixed to the tool head 68. A spring 79 normally holds the roller 76 against the guide face 75. The slide 69 is moved in and out by a hand lever 80 fixed to the frame 70 and connected to the slide 69 by a link 81. If the trimming knife 57 were rigidly fixed to the slide 69, the knife would move radially of the work piece and the cutting edge would maintain a constant angle relative to the surface of the piece. The clearance between the knife and the surface of the piece may be increased, however, as the tool moves inwardly by the action of the cam 75. The innermost position of the cutting edge is shown in broken lines in Fig. 7 as well as the line of travel of the cutting edge toward the work piece. As shown by broken lines in the drawings, elongated slots are provided in the ears 73 for the bolts that hold the bar 74 in place so that this bar can be adjusted to vary the position of the cam face 75, and it is apparent that the face 75 can be shaped to practically give any desired path of travel to the cutter blade.

I claim:

1. A trimmer comprising a trimming knife for removing excess material from the surface of a rotating, plastic, work piece, means for feeding said trimming knife toward said piece as material is removed from the surface thereof, said means comprising a movable tool support on which said knife is pivotally mounted and means operated by said feeding means for controlling the cutting angle of the edge of said knife to secure the most advantageous cutting angle for all positions of adjustment of said knife.

2. A trimmer comprising a cutting knife for trimming excess material from the outer surface of a rotating work piece while rotated, a holder for said knife for feeding said knife toward said piece as material is removed therefrom, said knife being adjustably mounted on said holder and means for automatically varying the position of said knife relative to said holder during the feeding operation of said holder to provide for a cutting action of said knife with a minimum of resistance to rotation of said piece for all operating positions of said knife.

3. A trimmer comprising a pivotally mounted tool holder having a tool pivotally mounted thereon and movable toward a rotating work piece when said tool holder is rotated on its pivotal mounting, and means operable by movement of said tool holder about its pivotal axis for varying the angular position of said tool on said holder during rotation of said holder on its pivotal mounting to maintain the cutting edge of said tool approximately tangent to the surface of said work piece for the various cutting positions of said tool.

4. A trimmer comprising a tool for trimming excess material from a rotating work piece during rotation thereof, a holder for said tool on which said tool is pivotally mounted, a pivotal support for said holder having its pivotal axis parallel to the axis of rotation of said piece, and means controlled by the angular position of said holder on its axis for rotating said tool relative to said holder about an axis parallel to the pivotal axis of said tool holder when said holder is moved upon its pivotal axis to feed the tool toward the work piece.

5. A trimmer comprising a tool for trimming excess material from a work piece during rotation of said work piece, a holder for said tool on which said tool is pivotally mounted, said holder being movable to feed said tool toward said work piece, and means controlled by the feeding movement of said tool holder for changing the angular position of said tool on said holder during feeding operation of said holder to maintain the cutting edge of said tool approximately tangent to the surface of said work piece for all positions of said tool but to increase slightly the angular clearance of said cutting edge as said tool approaches the axis of said work piece.

6. A trimmer comprising a trimmer blade arranged to engage the outer surface of a rotating work piece throughout a major portion of the length of said work piece, a holder for said blade adapted to feed said blade toward the axis of rotation of said work piece as material is removed from the outer surface of said work piece, said blade being pivotally mounted on said holder and automatic means controlled by the feeding movement of said holder for shifting the angular position of said blade relative to said holder during the feeding movement of said blade to maintain the most advantageous cutting angle of said blade relative to the surface of said work piece for all positions of said blade.

7. A trimmer comprising a cutting knife for trimming excess material from the outer surface of a rotating work piece, a holder for said knife for feeding said knife toward said piece as material is removed from said piece, said knife being adjustably mounted on said holder and means for automatically varying the position of said knife relative to said holder during the feeding operation of said holder to provide for a cutting action of said knife with a minimum of resistance to rotation of said piece for all operating positions of said knife, said means being constructed and arranged to position said knife at varying predetermined angles relative to said holder for the different positions of said holder relative to said work piece.

FLOYD G. BOVARD.